C. B. LORD.
MOTOR VEHICLE.
APPLICATION FILED MAY 31, 1912.
1,084,283.
Patented Jan. 13, 1914.
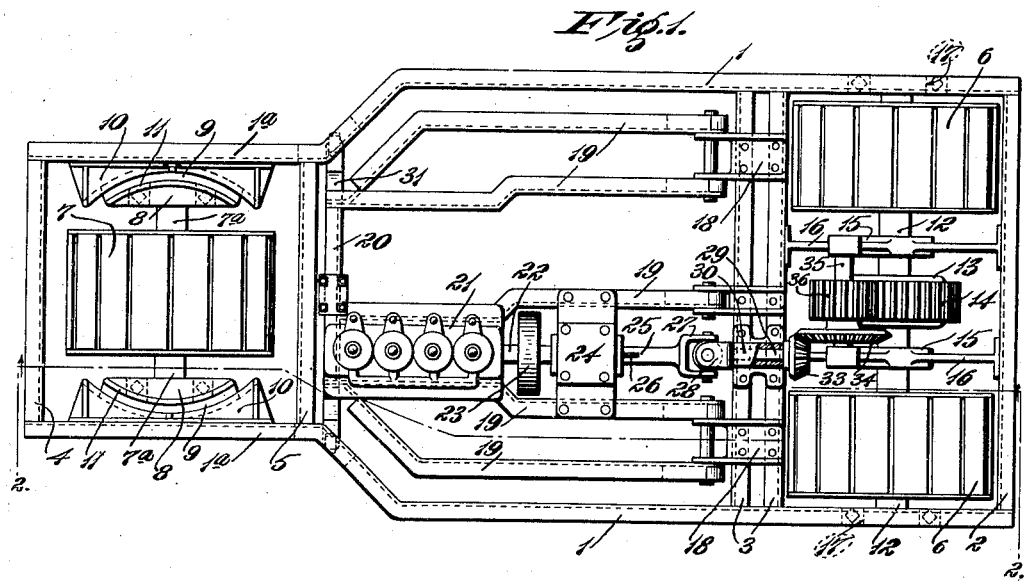
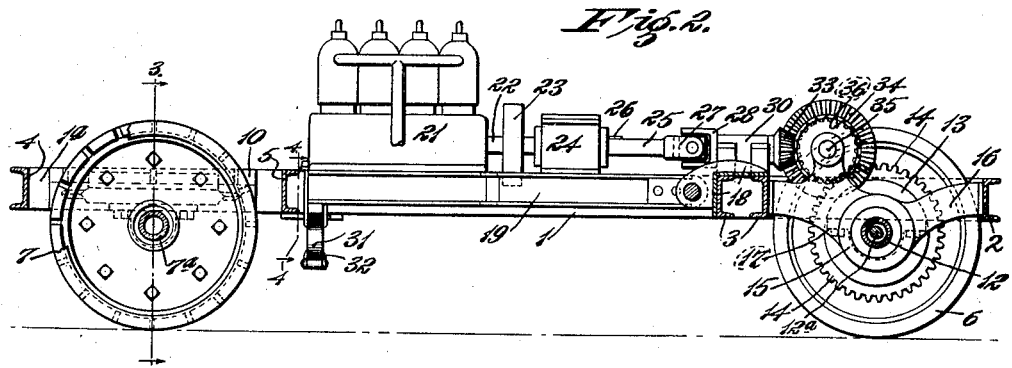
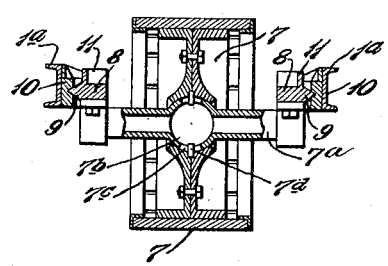
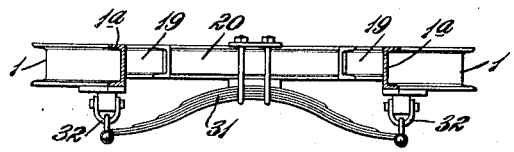
Witnesses:
Edgar T. Farmer
G. A. Pennington
Inventor
Chester B. Lord,
By Carr & Carr
his Attys.

UNITED STATES PATENT OFFICE.

CHESTER B. LORD, OF ST. LOUIS, MISSOURI.

MOTOR-VEHICLE.

1,084,283.      Specification of Letters Patent.      Patented Jan. 13, 1914.

Application filed May 31, 1912. Serial No. 700,662.

*To all whom it may concern:*

Be it known that I, CHESTER B. LORD, a citizen of the United States, and a resident of the city of St. Louis and State of Missouri, have invented a new and useful Improvement in Motor-Vehicles, of which the following is a specification.

This invention relates to motor propelled vehicles and more particuarly tractors and motor trucks of heavy type.

It has for its principal objects to produce a structure which permits the use of a rigid body frame and prevents the transmission of shocks to the motor and other parts carried by the vehicle; to obviate the disadvantages incidental to a rigid frame structure; and to attain certain advantages as will hereinafter more fully appear.

The invention consists in the parts and in the arrangements and combinations of parts hereinafter described and claimed.

In the accompanying drawing which forms part of this specification and wherein like symbols refer to like parts wherever they occur, Figure 1 is a top plan view of a tractor illustrating an embodiment of the invention; Fig. 2 is a section on the line 2—2 of Fig. 1; Fig. 3 is a section on the line 3—3 of Fig. 2; and Fig. 4 is a section on the line 4—4 of Fig. 2.

The structure shown in the drawings comprises a rigid body frame having side members 1 which are connected at one end by a transverse end member 2. Some distance inward from the member 2 said members 1 are connected by a spaced pair of transverse members 3. The opposite end portions of the side members are offset inwardly, as at 1$^a$, and said offset portions are connected by transverse members 4 and 5. The several frame members may be of any desirable cross section. As shown they are of channel section. They may be joined together in any obvious manner; hence no particular connection is shown.

The frame is mounted at its wide end on a pair of wheels 6 which are located within the frame, and at its contracted end on a wheel 7 also located within the frame, thus giving it a three point support. The pair of wheels 6 are the drivers and may be of any desirable traction type, but as shown are constructed like the wheel disclosed in Letters Patent No. 1,019,165, granted to me on March 5, 1912. The wheel 7 is also of the same type, and it is swiveled so that the vehicle can be turned and steered. As shown, it is mounted on an axle 7$^a$ journaled in bearings on segmental members 8 which latter have peripheral ribs 9 fitted in the counterpart grooves in segmental supporting frames or brackets 10 fixed on the portions 1$^a$ of the main frame side members. The members 8 are provided with upstanding arcuate flanges 11 to coöperate with steering cords secured to the forward portions of the members 8 and carried back past the outer faces of said flanges 11 and connected to a suitable controlling device not shown.

To compensate for any unevenness of the surface over which the vehicle travels, the front axle 7$^a$ is provided with a central spherical enlargement 7$^b$ which is fitted to move easily in a counterpart socket in the hub portion of the wheel 7. The enlargement 7$^b$ has slots 7$^c$ therein which extend in the longitudinal direction of the axle and the hub portion of the wheel is provided with pins 7$^d$ that project through said slots so that the wheel and axle rotate together but are permitted a rocking movement with respect to each other. In this way the frame is relieved of torsional strains and the swivel bearings are not liable to bind as would be the case if the wheel were mounted rigidly on the axle.

The rear wheels 6 are fixed to or made integral with tubular live axle sections 12 whose inner ends are connected by a suitable compensating or differential gear housed in a casing 13 having a spur gear 14 thereon. The sections 12 are journaled in bearings 15 on struts or brackets 16 secured to the transverse frame members 2 and 3 at opposite sides of the differential gear casing 13. The tubular sections 12 are also sleeved over a dead axle 12$^a$ on which the wheels 6 are journaled. This dead axle extends entirely across the machine and has its ends secured by members 17 to the under side of the side members 1 of the body frame.

Pivoted to brackets 18 on the transverse frame members 3 is a platform frame comprising longitudinal members 19 and an end member 20. The members of this platform frame may be shaped and arranged to suit different conditions and requirements, according to the shape, size and weight of the respective parts to be carried thereon. On this platform frame is mounted a motor 21. On it may also be placed a seat for the driver, as well as the fuel and water tanks, and the adjunctive devices usually carried upon machines of this character.

The crank shaft 22 of the motor is provided with the usual flywheel 23, and said crank shaft extends into a housing 24 containing a suitable transmission gear (not shown). A propeller shaft 25 has a feather-keyed connection at one end with the transmission gear, as at 26, and at its opposite end it is provided with a universal coupling member 27 which coöperates with a similar member 28 on a short driving shaft 29 journaled in a bearing 30 on the transverse frame members 3. The transverse axes of the universal joint are in a plane vertically through the axis of the platform frame pivots so that when the platform swings on its pivots the parallelism of the platform and shafts which engage the motor and universal joint is substantially maintained.

The front end of the platform is supported on a spring 31 which is strong enough to carry the weight of the platform and the parts mounted thereon, yet having sufficient resiliency to absorb the shocks to which motor vehicles and tractors are subjected and thereby prevent the parts on the platform from being jarred loose from their mountings. The sliding or feather-key connection between the propeller shaft and transmission gear and a slight looseness at the universal joint between the propeller shaft and driving shaft allows the platform sufficient movement to enable the spring to exercise its function. The spring 31, as shown, is an ordinary platform cross spring. It is secured at its middle to the under side of the end member 20 of the hinged platform frame, and is supported at its ends on hangers 32 secured to the side members 1 of the main frame. However, it is obvious that other types of springs may be substituted for that shown.

A bevel pinion 33 is fixed on the driving shaft 29 and it meshes with a bevel gear 34 secured on a counter-shaft 35 journaled in extensions of the bracket members or struts 16. The countershaft 35 has fixed thereon a spur pinion 36 which meshes with the spur gear 14 on the differential gear housing 13. By this construction the intermeshing gears of the driving train are mounted on the rigid frame so that they can be maintained in fixed working relation and are not subject to continuous vibration as would be the case if the engine were mounted direct on the main frame. Furthermore, the engine and other heavy parts of the tractor being located on the hinged platform or frame the shocks to the main frame are not transmitted thereto.

Obviously, the construction and arrangement admits of considerable modification without departing from the invention. Therefore, I do not wish to be limited to that shown.

What I claim is:

1. In a motor vehicle, a main frame, a platform frame pivoted at one end and resiliently supported at its opposite end on said main frame, a driving shaft on said main frame, a motor on said platform frame, and power transmission means connecting said motor and said driving shaft, said means including a propeller shaft connected to said driving shaft by a universal joint operating in proximity to the pivotal axis of said platform frame.

2. In a motor vehicle, a main frame, a platform frame pivoted at one end transversely on said main frame and resiliently supported at its opposite end, a driving gear on said main frame, a motor on said platform frame, and power transmission means connecting the motor and said driving gear, said power transmission means including a universal joint operating in proximity to the pivotal axis of the platform frame, and a compensating power connection between the motor and said universal joint.

3. In a motor vehicle, a main frame, a platform frame pivoted transversely at one end on said main frame and resiliently supported at its opposite end, a driving train of gears on said main frame, a power shaft journaled on said main frame and operatively connected with said driving train of gears, a motor on said platform frame adjacent to its resiliently supported end, and a propeller shaft having a compensating connection with the motor and connected to said power shaft by a universal joint operating in proximity to the pivotal axis of said platform frame.

4. In a motor vehicle, a main frame, a platform frame pivoted at one end transversely on said main frame and resiliently supported at its opposite end, a driving train of gears mounted on said main frame, a power shaft journaled on said main frame in a longitudinal direction and having a gear thereon constituting the driving gear for said driving train of gears, a motor on said platform frame adjacent to its resiliently supported end, and a propeller shaft extending in line with said power shaft and coupled therewith by a universal joint operating in proximity to the pivotal axis of said platform frame, said propeller shaft having a power connection with said motor adapted to compensate for the pivotal movement of said platform.

Signed at St. Louis, Missouri, this 21st day of May, 1912.

CHESTER B. LORD.

Witnesses:
G. L. EVANS,
M. A. CULLEN.